Feb. 14, 1961     T. A. MILLER     2,972,035
ELECTRICALLY HEATED TRIMMING KNIFE
Filed Sept. 3, 1958

INVENTOR.
THEODORE A. MILLER
BY
Oldham & Oldham
ATTYS.

United States Patent Office 2,972,035
Patented Feb. 14, 1961

2,972,035
ELECTRICALLY HEATED TRIMMING KNIFE

Theodore A. Miller, 861 Chestnut Blvd.,
Cuyahoga Falls, Ohio

Filed Sept. 3, 1958, Ser. No. 758,724

2 Claims. (Cl. 219—21)

This invention relates to knives for trimming the mold flash from molded articles of thermoplastic material.

In the manufacture of articles of molded plastic material, the material in fluid state is forced between meeting mold members and forms flash or fins which must be removed from the articles after the molding operation. Where the contour of the surface of the article is complicated, trimming of the article becomes quite a problem.

It is an object of the present invention to provide a trimming tool that will follow a surface of complicated form and will quickly separate a flash therefrom.

A further object is to provide a tool which may be manipulated by hand about the article to be trimmed.

A further object is to provide an electrically heated tool which will soften the flash progressively as it cuts.

A further object is to provide a tool which will not become stained or tarnished during use.

These and other objects will appear from the following description and the accompanying drawings.

Figure 1:
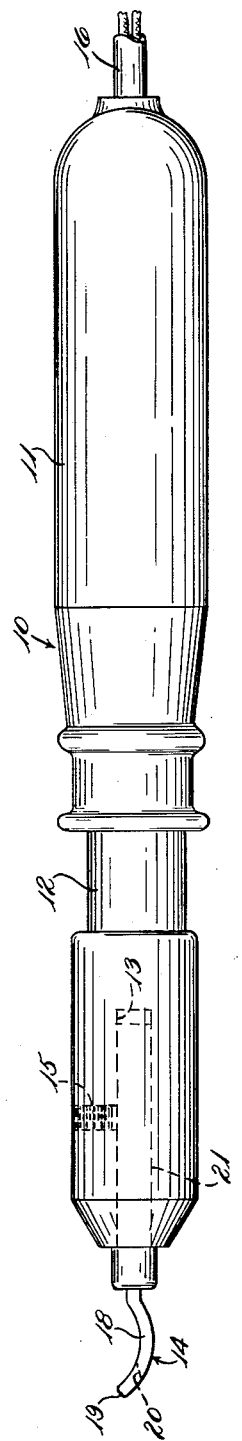
Fig. 1 is a side view of the trimming knife.
Figure 2:
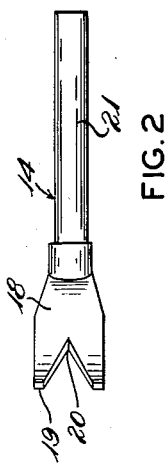
Fig. 2 is a face view of the bit.

Referring to the drawing which shows a preferred embodiment of the invention, the numeral 10 designates a heating member comprising a handle 11 of insulating material and a shank 12 of heat conductive metal which extends from within the handle and is formed with an axial socket 13 or bore for engaging and heating a knife bit 14 held therein by a set screw 15. Within the handle 11 electrical heating means of well known construction is provided as in soldering irons of well known makes and a flexible supply cord 16 is provided for providing an electric power supply. A suitable heating member is the well known soldering iron, known as "American Beauty No. 3128." Power from the supply cord 16 supplies a resistance heating unit within the handle 11 which supplies heat through shank 12 to socket 13.

The trimming knife bit 14 is of stainless steel and comprises a longitudinally bowed relatively thin and relatively wide blade 18 terminating in a V-notched end 19. The notch 20 in the center of the end 19 has its defining walls diverging away from the convex undersurface of the knife so as to provide relatively sharp margins at the convex face. The shape of the knife is similar to the claw of a claw-hammer. The convex heel surface 14 is heated with the blade and smooths the surface of the parting line as it trims.

For supporting the blade and conducting heat thereto, a cylindrical shank 21 extends rearwardly of the blade for engaging in socket 13.

In the use of the invention the cord 16 is connected to a supply line and preferably the current is supplied through a rheostat in order to adjust the temperature of the knife. A suitable rheostat is the "Ohmite 100 Watt Model K Series A" having a resistance of 750 ohms. The blade is pushed along the line of flash with its V-notch at such line and the flash is softened and smoothed by the heat while the knife edges along the notch sever the flash progressively from the article. As the blade is of stainless steel it is not oxidized by heating and does not become stained or tarnished in use.

Thus it will be seen that the objects of the invention have been accomplished.

While a certain representative embodiment and details have been shown for the purpose of illustrating the invention it will be apparent to those skilled in this art that various changes and modifications may be made therein without departing from the scope of the invention as it is defined by the following claims.

I claim:

1. An electrically heated knife for trimming flash from plastic molded articles, said knife comprising a longitudinally bowed blade of substantially uniform thickness having substantially parallel convex and concave faces, the end of the blade being formed with a V-notch extending into its bowed portion and relieved toward the concave face of the blade to provide relatively sharp margins defining the notch at the convex face of the blade, the convex face along said notch and rearwardly thereof defining a smooth heated convex sole surface about the notch and rearwardly thereof to smooth the trimmed area of the article, an axially directed shank integral with said blade for holding it and conducting heat thereto, and an electrically heated handle member having a socket for receiving and holding the blade with its notched end extending from said member.

2. An electrically heated knife for trimming flash from plastic molded articles, said knife comprising a longitudinally bowed blade of substantially uniform thickness having substantially parallel convex and concave faces, the end of the blade being formed with a V-notch extending into its bowed portion and relieved toward the concave face of the blade to provide relatively sharp margins defining the notch at the convex face of the blade, the convex face along said notch and rearwardly thereof defining a smooth heated convex sole surface about the notch and rearwardly thereof to smooth the trimmed area of the article, an axially directed shank integral with said blade for holding it and conducting heat thereto, and an electrically heated handle member having a socket extending from said member, said blade being of stainless steel.

References Cited in the file of this patent

UNITED STATES PATENTS

| | | |
|---|---|---|
| 649,987 | Jones | May 22, 1900 |
| 1,192,389 | Chandler | July 25, 1916 |
| 1,732,076 | Alderman et al. | Oct. 15, 1929 |
| 2,010,590 | Grumbacher | Aug. 6, 1935 |
| 2,452,259 | Pabis | Oct. 26, 1948 |
| 2,620,692 | Marshall | Dec. 9, 1952 |